United States Patent [19]
Leahy

[11] 3,956,699
[45] May 11, 1976

[54] ELECTROMAGNETIC WAVE COMMUNICATION SYSTEM WITH VARIABLE POLARIZATION

[75] Inventor: Henry C. Leahy, Severna Park, Md.

[73] Assignee: Westinghouse Electric Corporation, Pittsburgh, Pa.

[22] Filed: July 22, 1974

[21] Appl. No.: 490,641

[52] U.S. Cl. .............................. 325/15; 325/180; 325/369; 343/100 PE; 343/176
[51] Int. Cl.² ........................................... H04L 5/14
[58] Field of Search .......... 325/367, 368, 369, 180, 325/308, 156, 15, 60; 343/853, 854, 100 SA, 100 PE, 176

[56] References Cited
UNITED STATES PATENTS

| | | | |
|---|---|---|---|
| 2,313,048 | 3/1943 | Byrne................................. | 325/180 |
| 2,840,696 | 6/1958 | Beck et al........................... | 325/156 |
| 3,028,593 | 4/1962 | Alford............................. | 343/100 R |
| 3,048,840 | 8/1962 | Ferrar et al........................ | 343/176 |
| 3,137,853 | 6/1964 | Cutler............................ | 343/100 PE |
| 3,187,259 | 6/1965 | Scandurra et al.................... | 325/308 |
| 3,354,459 | 11/1967 | Schwartz et al. .................... | 343/854 |
| 3,760,274 | 9/1973 | Vogt..................................... | 325/60 |

Primary Examiner—George H. Libman
Attorney, Agent, or Firm—D. Schron

[57] ABSTRACT

An electromagnetic transmitting or receiving communications system with multiple polarization capability. In the transmit mode an input signal is divided between two signal processing channels which feed a dual mode radiation element for exciting orthogonal polarizations. The signals in the two channels are shifted in phase relative to one another prior to power amplification. In the receive mode first and second channels connected to the dual mode element process received signals of certain polarizations governed by phase shifting the channel signals relative to one another, the phase shifting taking place after amplification. Various parallel channels may be incorporated in the receive mode of operation to simultaneous process signals of the same, or other polarizations and when incorporated within an array having electronic beam steering, the polarization selection may at each respective channel be combined with the beam steering function.

7 Claims, 3 Drawing Figures excellent # ELECTROMAGNETIC WAVE COMMUNICATION SYSTEM WITH VARIABLE POLARIZATION

BACKGROUND OF THE INVENTION

1. Field of the Invention

The invention in general relates to communications systems and more particularly to a multi-function aperture system.

2. Description of the Prior Art

In communications systems, that is a system which transmits and/or receives information, a radar system being one example, a multiple polarization capability is often desired for various reasons. The flexibility of multiple polarization modes of operation is usually achieved by inserting a switching system between the electronic components of a source of wave energy and a multiple polarization radiation structure having two feed points exciting orthogonal polarizations. Thus, in a combination transmitter-receiver system, the polarization control function is implemented after power amplification, in the transmitter case, and before amplification in the receiver case. Such an arrangement is costly in terms of RF energy efficiency and undesirable because of degradation in the sensitivity of the system.

SUMMARY OF THE INVENTION

In the present invention, an arrangement is provided such that network losses of RF energy are reduced, and degradation of sensitivity is substantially removed. This is accomplished by a rearrangement of the polarization control function so as to be prior to power amplification in the transmitter case, and subsequent to amplification in the receiver case.

This is accomplished with the provision of a dual mode radiation element, within a radiation aperture, for transmitting and/or receiving electromagnetic signals with mutually orthogonal polarization modes. In the transmitter case first and second electronic signal processing channels are connected to the radiation element and an input signal is divided between the two channels. Circuit means in each channel are provided for shifting the phase of the signal in one channel relative to the other channel to accomplish polarization control, and this is done prior to power amplification.

In the receiver case, first and second electronic signal processing channels are provided and are connected to the radiation element and include circuit means for shifting the phase of the signals in these channels relative to one another, to detect signals of desired predetermined polarizations. The phase shifting is accomplished subsequent to IF amplification. In the receive mode, parallel channels may be added to the first and second channels for processing signals of various other polarizations and if electronic beam steering is incorporated in the system, the phase shifters to effect such steering may also be utilized to effect the polarization control.

DESCRIPTION OF THE PREFERRED EMBODIMENT

A better understanding of the present invention may be obtained with a brief discussion of how specific resultant polarizations are achieved, with a case of combining linearly polarized components being the easiest to understand.

Figure 1:
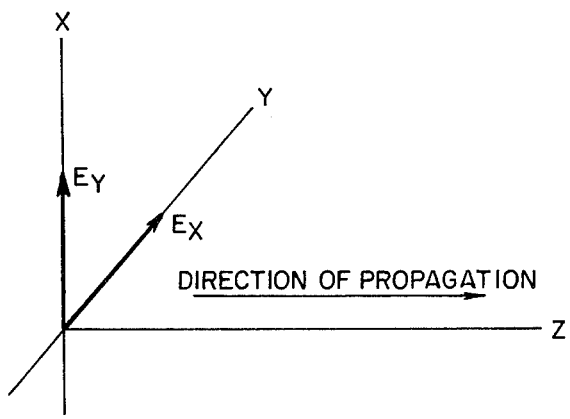
FIG. 1 is a vector representation of elliptical polarization.

An elliptically polarized wave can be considered as the resultant of two linearly polarized waves of the same frequency. Considering FIG. 1, it is readily seen that an elliptically polarized wave propagated in the direction of the Z axis can be represented by two linearly polarized components $E_Y$ and $E_X$. The instantaneous values for the two electric field components are then:

$$E_X = E_1 \sin(\omega t) \quad (1)$$

$$E_Y = E_2 \sin(\omega t + \delta) \quad (2)$$

where $E_1$ is the amplitude of the horizontally polarized wave, $E_2$ is the amplitude of the vertically polarized wave, and $\delta$ is the time phase angle by which $E_Y$ leads $E_X$. Equations 1 and 2 can be reduced to the formula for an ellipse:

$$\frac{E_X^2}{E_1^2} - \frac{2E_X E_Y \cos\delta}{E_1 E_2} + \frac{E_Y^2}{E_2^2} = \sin^2\delta \quad (3)$$

Several special cases are particularly relevant to the present invention. Thus, when $E_Y$ is either in phase with $E_X$ or exactly 180° out of phase with $E_X$ ($\delta = K\pi$, where $K = 0, 1, 2, 3 \ldots$), equation 3 reduces to the form:

$$E_Y = \pm \frac{E_2}{E_1} E_X \quad (4)$$

In this case then, the resultant wave is linearly polarized with the electric field E, in general, oriented dependent upon the values of $E_2$ and $E_1$. For instance, if $E_2 = 0$, the electric field E lies in the direction of the X axis and the resultant wave is said to be horizontally polarized. Whereas, if $E_1 = 0$, the electric field E lies in the direction of the Y axis and the resultant wave is said to be vertically polarized. When $E_1 = E_2$, and $\delta = 0$, the electric field E is linearly polarized at an angle of 45° with respect to the positive X axis. If $E_1 = E_2$, but $\delta = \pi$, then the electric field E lies at an angle of −45° with respect to the positive X axis.

Another special case of elliptical polarization obtains when the magnitudes $E_1$ and $E_2$ are equal and in time phase quadrature. Then the equation 3 reduces to the following $$\frac{E_X^2}{E_1^2} + \frac{E_Y^2}{E_2^2} = 1 \quad (5)$$

Equation 5 will be recognized as an equation for a circle. Hence, when the two linearly polarized component waves are in time phase quadrature, with equal amplitudes, the resultant wave is circularly polarized.

Figure 2:
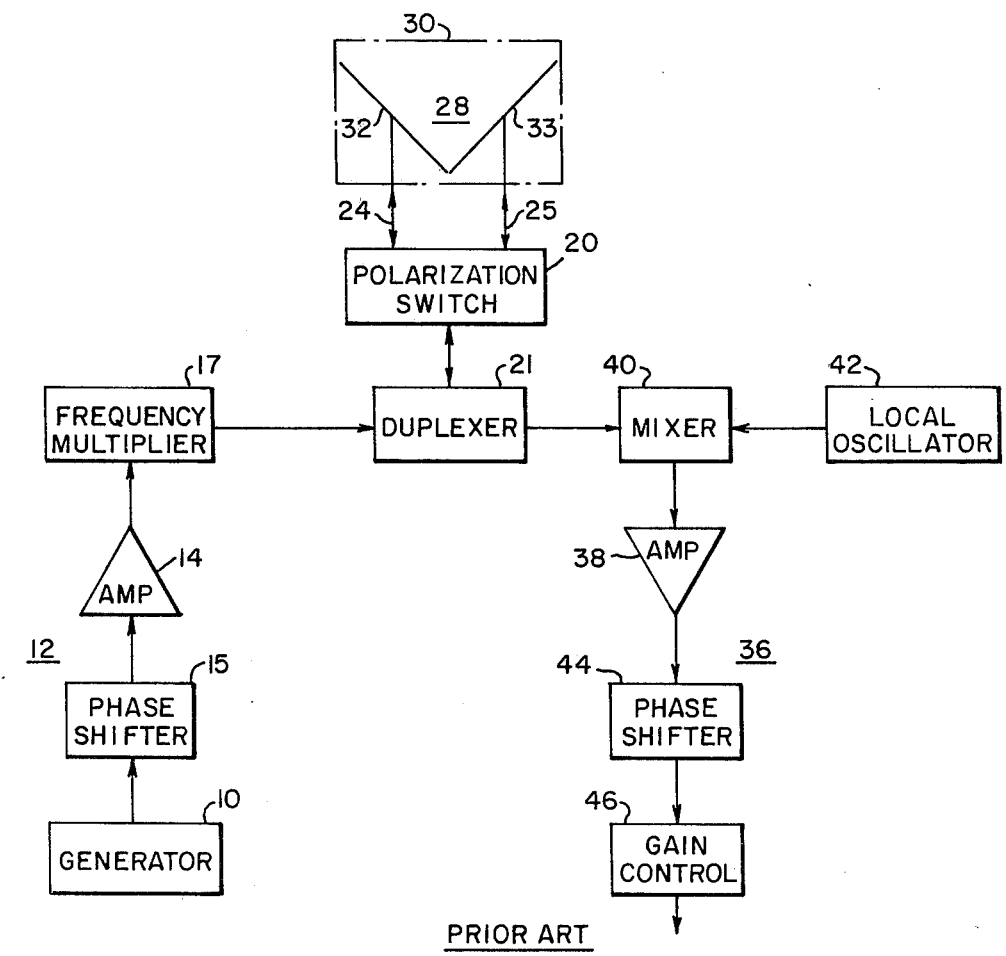
FIG. 2 is a block diagram of a prior art communications system having multiple polarization capabilities.

FIG. 2 illustrates a prior art communications system with multiple polarization capabilities. The prior art system, as well as the present invention is based on the concept that the polarization of any electromagnetic wave propagated in space can be resolved into the two orthogonal linear polarization modes. In general, the polarization of the radiated field may be treated as though the electric vector is linearly polarized at any instant of time, since elliptical polarization can be divided into two linearly polarized orthogonal waves of the same frequency travelling in the same direction.

The principal planes of an antenna pattern are by convention associated with a linearly polarized component of the electric field associated with the electromagnetic wave. If one designates the components as $E_X$ and $E_Y$ the horizontal and vertical polarizations respectively, a single antenna element can be oriented so that one component can be received or propagated, as desired while being blind to the other component. However, a dual mode radiation element arranged to receive orthogonally polarized waves will receive or transmit electromagnetic wave of any desired polarization.

In the prior art communications system of FIG. 2, electromagnetic wave energy is supplied from a generator 10. The wave energy at the output of generator 10, is applied to a signal processing channel 12 which includes a power amplifier 14. If the arrangement is part of a large array having beam steering capabilities, there will be provided a phase shifter 15 which in response to an input signal or command from a central control will vary the phase of the signal in channel 12 relative to the signals in similar channels of the array. Such phase shifters are well known to those skilled in the art. If desired, the signal processing channel may include a frequency multiplier 17 and the signal is applied to a polarization switch 20 through duplexer 21.

The polarization switch 20 selectively supplies wave energy to feed points 24 and 25 of a dual mode radiation element 28 within aperture 30. The dual mode radiation element may be any one of a variety of structures for transmitting or receiving electromagnetic signal with mutually orthogonal polarization modes and is illustrated in FIG. 2 as mutually perpendicular dipole elements 32 and 33.

The receiver portion of the system includes a signal processing channel 36 connected to the dual mode element 28 through polarization switch 20 and duplexer 21. The signal processing channel includes amplifier means in the form of preamp 38 which amplifies the IF signal from mixer 40 supplied with a signal from the local oscillator 42.

The IF signal is supplied to the detector portion of the system (not illustrated) through the phase shifter 44, used for beam steering, and gain control circuit 46.

The use of the polarization switch 20, results in an objectionable power loss both in the transmit and receive modes of operation and much of the power supplied to the switch actually heats it up.

Furthermore, in the receive mode of operation, the polarization switch at any given instant of time is totally dedicated to one polarization mode whereas in the present invention signals of various polarization modes may be simultaneously received and detected. One embodiment of the present invention is illustrated in FIG. 3 to which reference is now made.

Figure 3:
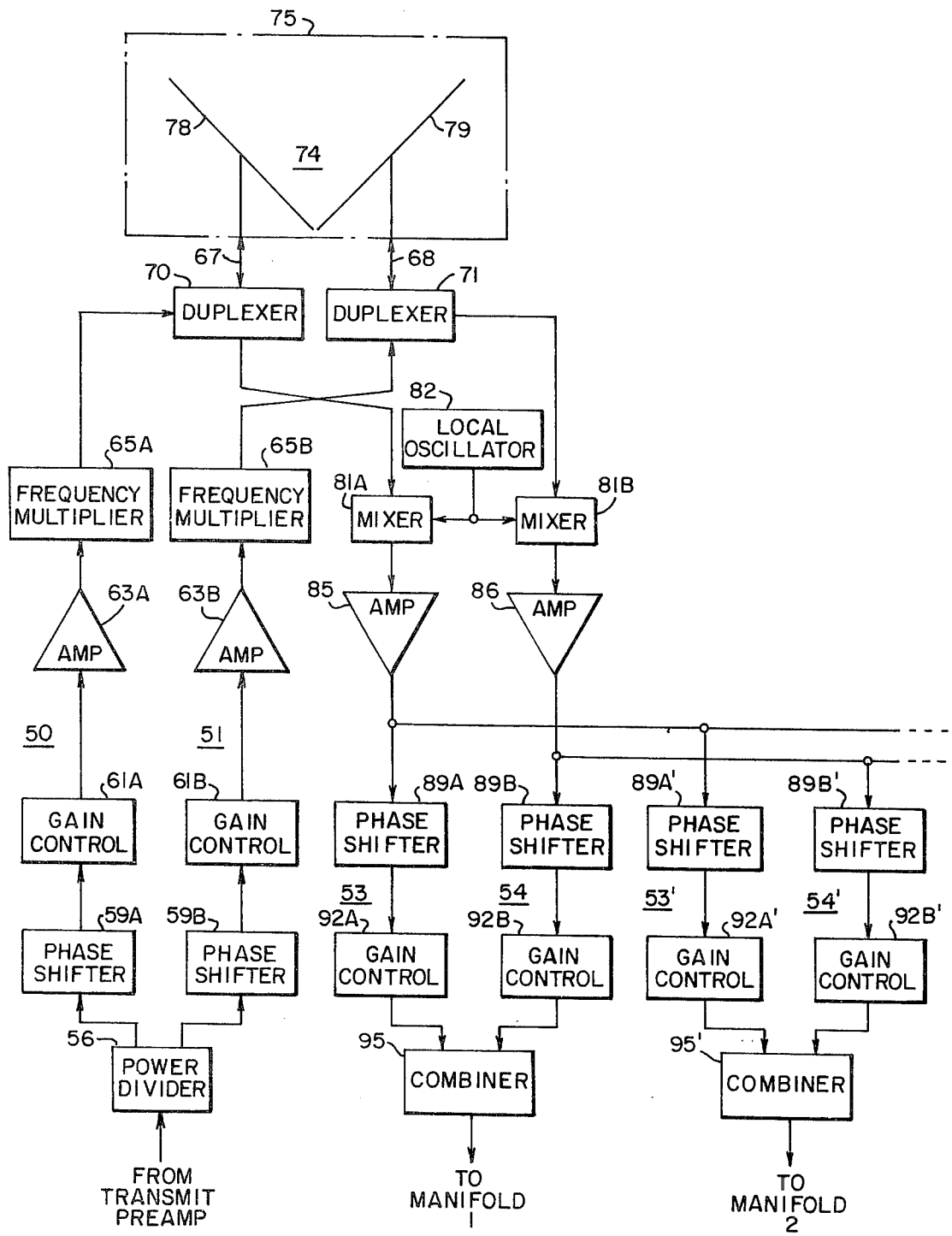
FIG. 3 is a block diagram of a preferred embodiment of the present invention.

Although the present invention may take the form of just a transmitter or just a receiver, FIG. 3 illustrates it as a practical transmit-receive system. The system illustrated in FIG. 3 may be considered as a building block in a communications system comprising hundreds or even thousands of similar networks. According to the present invention, the polarization control function in the transmit mode is placed ahead of power amplification so that, in absolute magnitude, not as much power is wasted as in the prior art system. In the receive mode of operation, if the control function is made directly on the received signal there will be a consequent attenuation and a degradation in the sensitivity of the system. In the present system this is obviated by placing the control function subsequent to amplification of the received signal.

These mode are accomplished by provision of two signal processing channels 50 and 51 for the transmit mode, and two signal processing channels 53 and 54 for the receive mode. The dual electronic channels allow for simultaneous operation on a signal to be transmitted so as to result in a desired polarization of the radiated electromagnetic signal.

Generally, the basic polarization modes of the wave energy of the two signal processing channels 50 and 51 are linear. As discussed previously it is possible to realize electromagnetic wave radiation having various resultant polarizations such as vertical or horizontal linear mode and right or left hand circular modes. This can be accomplished by dividing the input signal from the transmit preamplifier into the first and second signal processing channels 50 and 51 by means of a power divider circuit 56. The polarization function is then accomplished by commanding predetermined phase differences between the two signals by means of a phase shifter in at least one of the channels. In order to provide for beam steering capabilities, in addition to polarization control, the present invention includes two phase shifters 59A and 59B for respective channels 50 and 51.

Where state of the art permits, if the amplitudes of the signals in the respective channels are modulated, additional resultant polarization modes including various elliptical polarizations can be achieved. Accordingly, gain control circuits 61A and 61B may be provided, however even without this amplitude control, vertical, horizontal, 45° half power linear, and right and left hand circular polarization modes can be realized by appropriate phase shifter settings, plus in the case of 45° linear polarization, on off switching circuitry.

The two parallel signals are then power amplified by means of amplifiers 63A and 63B, and if desired frequency multipliers 65A and 65B may be supplied. The two signals in channels 51 and 50 are supplied to feed points 67 and 68 through respective duplexers 70 and 71. The feed points 67 and 68 are in signal transfer relationship with a dual mode radiation element 74 of the type which will transmit or receive electromagnetic signals with mutually orthogonal polarization modes. Such dual mode radiation element may be of various forms such as orthogonal slots in a plate, a single waveguide terminating behind an aperture in a plate and having mutually orthogonal input ports and capable of supporting two independent wave systems, or a variety of other arrangements. FIG. 3 illustrates the dual mode radiation element simply as two dipole elements 78 and 79 arranged perpendicular to one another.

In the receiver portion of the system, signal processing channels 53 and 54 are connected to respective duplexers 70 and 71 for conduction of signals from the dual mode radiation element 74. An IF signal is produced in each channel with the provision of mixers 81A and 81B in conjunction with local oscillator 82, as is well known. The respective IF signals in channels 53 and 54 are amplified by means of IF preamplifiers 85 and 86 and the determination of which polarization modes will be detected is governed by the relative settings of phase shifters 89A and 89B. Respective gain control circuits 92A and 92B are provided and the signals from the two channels 53 and 54 are combined in circuit 95 and thereafter sent to a first manifold which receives similar signals from identical circuits, and provides an output signal to detector circuitry.

The flexibility of the receive mode of operation is greatly increased with the addition of other dual channels which can be commanded to simultaneously respond to different polarizations. One such additional set is illustrated and designated with prime reference numerals. Thus signal processing channels 53' and 54' may be connected to the output of the amplifiers 85 and 86 and by commanding phase shifters 89A' and 89B', not only may a different polarization be detected, but a receiving beam may be pointed in a different direction than the receiving beam associated with the dual channels 53 and 54. The arrangement for example allows for transmitting one polarization while separately receiving other polarizations for discrimination of various radar target properties such as the well known rain discrimination technique. Further, by connecting the other dual channels at a higher point such as the output of the duplexers 70 and 71, and with the provision of different local oscillators, the additional parallel dual channels may have the capabilities of responding not only to different polarizations but to signals of different frequencies.

Accordingly, there has been provided an electromagnetic wave system wherein any desired polarization may be excited or received with appropriate individual phase and amplitude control. Even without amplitude control, in the case of the basic polarizations being linear, four possible radiation polarizations (two orthogonal linears and right and left hand circular) are realized by commanding phase differences between the phase shifters of the transmit signal processing channels (or receive signal processing channels) of 0°, +90°, −90° and 180°. With beam steering capabilities, the beam steering control may be combined with the polarization selection control such that the same phase shifters may be used for beam steering and polarization mode selection.

What is claimed is:

1. An electromagnetic wave system comprising:
   A. at least one radiation aperture having a dual mode radiation element therein for both transmitting and receiving electromagnetic signals with mutually orthogonal polarization modes;
   B. first and second electronic signal processing channels connected in signal transfer relationship therewith for conduction of signals to said element when in the transmitter mode of operation and at least third and fourth electronic signal processing channels in signal transfer relation therewith for conduction of signals from said element, in the receiver mode of operation; and
   C. variable polarization control means for shifting the phase of the signals in said first and second channels relative to one another, and in said third and fourth channels relative to one another in accordance with a predetermined desired polarization.

2. An electromagnetic wave transmitter comprising:
   A. at least one radiation aperture having a dual mode radiation element therein for transmitting electromagnetic signals with mutually orthogonal polarization modes;
   B. first and second electronic signal processing channels connected in signal transfer relationship therewith for conduction of signals to said element;
   C. means for receiving an RF input signal to be transmitted and power dividing said input signal between said first and second channels; and
   D. variable polarization control means for shifting the phase of the signals in said first and second channels relative to one another in accordance with a predetermined desired polarization to be transmitted.

3. An electromagnetic wave transmitter according to claim 2 wherein said circuit means includes:
   A. a first phase shifter in said first channel; and
   B. a second phase shifter in said second channel.

4. An electromagnetic wave transmitter according to claim 3 wherein:
   A. said first channel includes a first power amplifier;
   B. said second channel includes a second power amplifier;
   C. said first and second phase shifters being respectively positioned between said first and second power amplifiers and said means for receiving an input signal.

5. An electromagnetic wave transmitter according to claim 4 which additionally includes:
   A. gain control means in each said channel.

6. An electromagnetic wave receiver comprising:
   A. at least one radiation aperture having a dual mode radiation element therein for receiving electromagnetic signals with mutually orthogonal polarization modes;
   B. first and second electronic signal processing channels connected in signal transfer relationship therewith for conduction of signals from said element;
   C. a plurality of sets of additional first and second signal processing channels for independently processing a received signal, each said set being operatively connected to said element;
   D. each said set including circuit means for shifting the phase of the signals in the first channel of the set relative to the signal in the second channel of the set.

7. An electromagnetic wave system according to claim 1 which includes:
   A. a transmitter portion including first and second transmitter signal processing channels;
   B. a receiver portion including first and second receiver signal processing channels;
   C. duplexer means connecting said transmitter portion to said element and said element to said receiver portion.

* * * * *